Aug. 27, 1968   H. N. WATROUS   3,398,660
MACHINE FOR MAKING FRAME BLANKS AND FOR THEREAFTER
FORMING SAID BLANKS AROUND AN ARTICLE
Filed Sept. 20, 1966   8 Sheets-Sheet 1

INVENTOR.
Howard N. Watrous
BY Frederick H. Braun
ATTORNEY

INVENTOR.
Howard N. Watrous
BY Frederick H. Brown
ATTORNEY

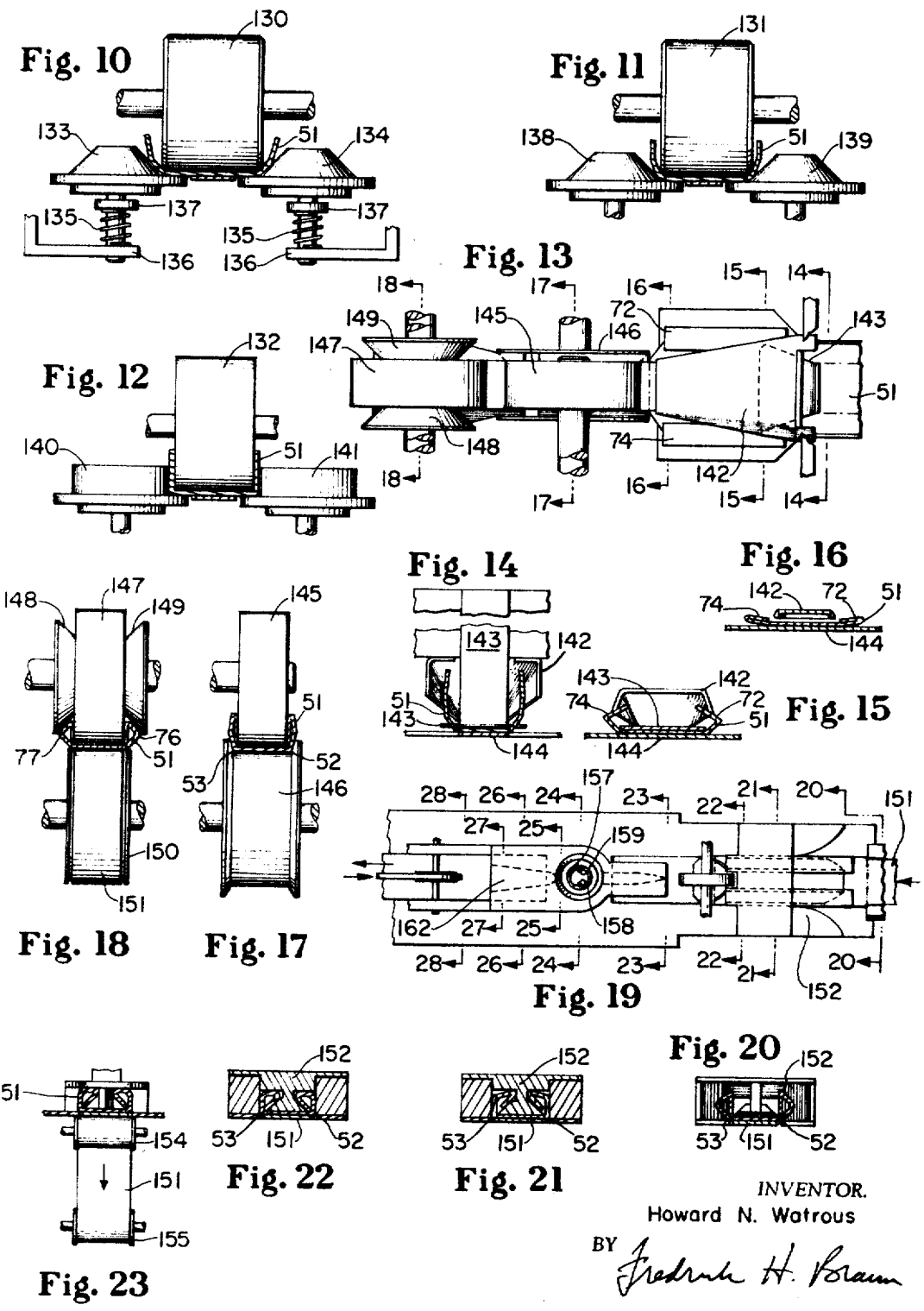

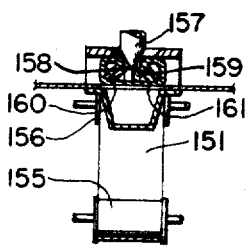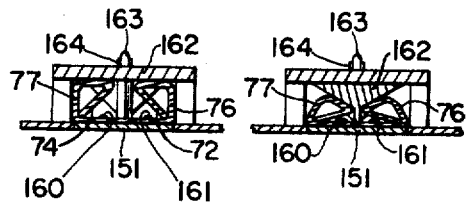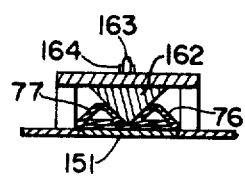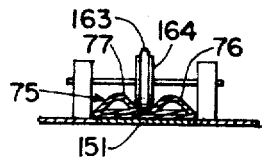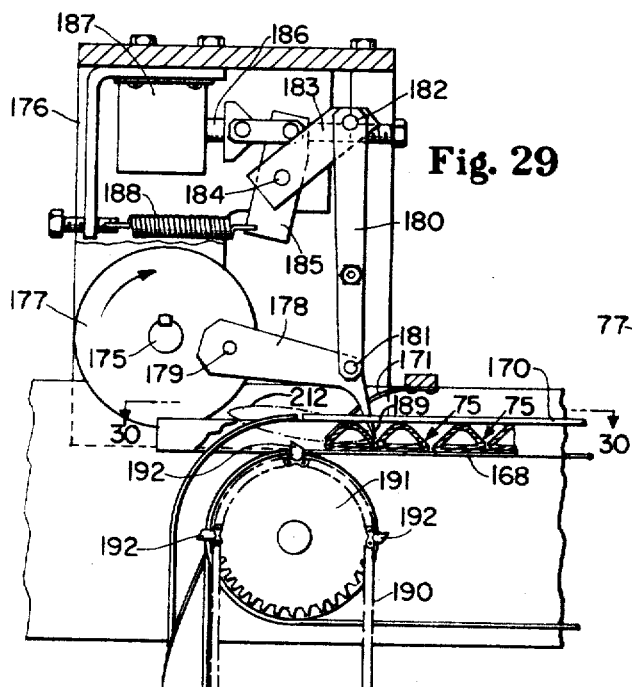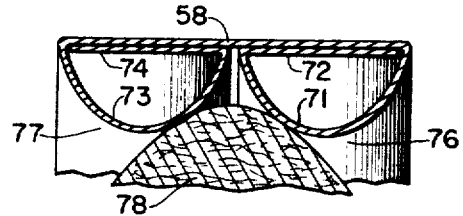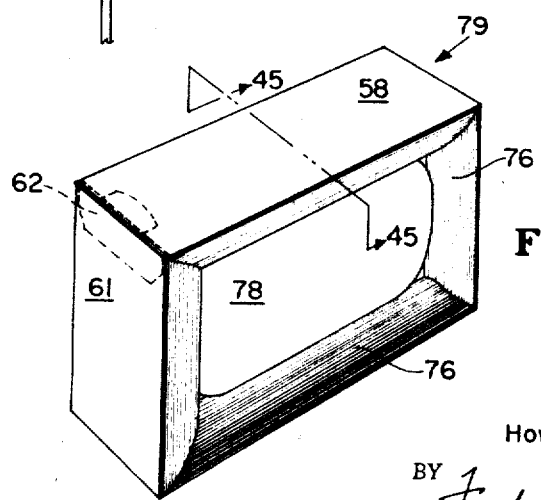

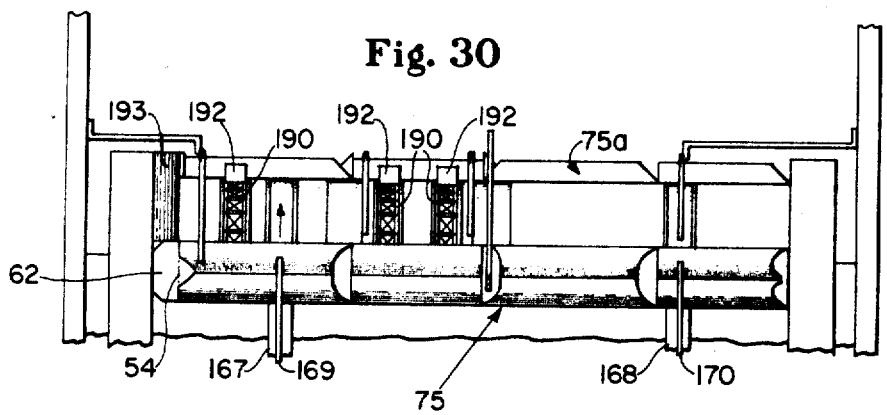
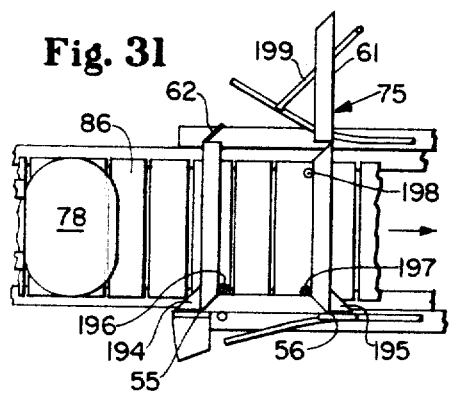
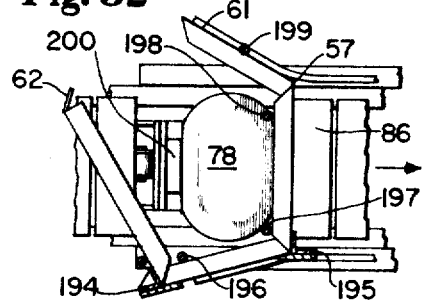
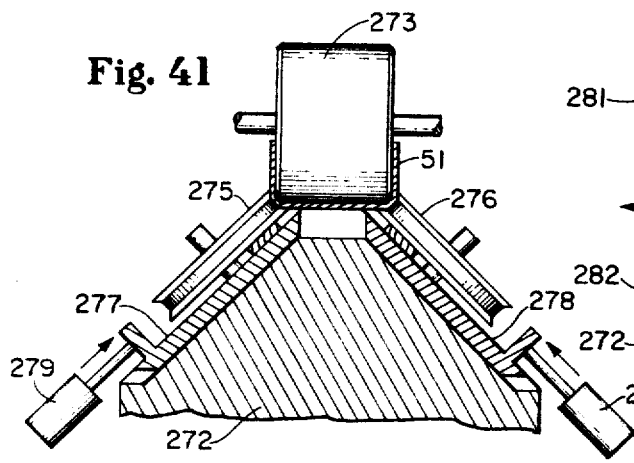
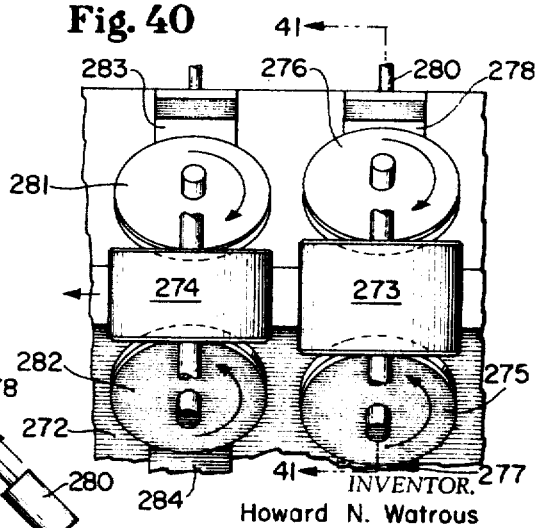

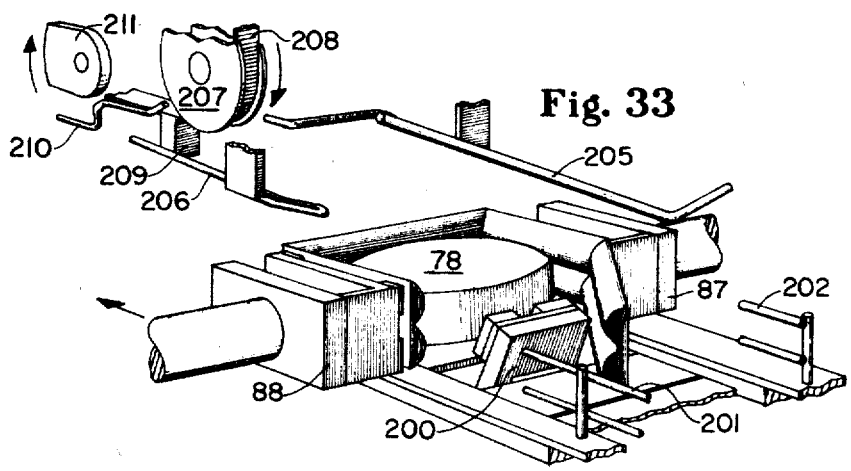
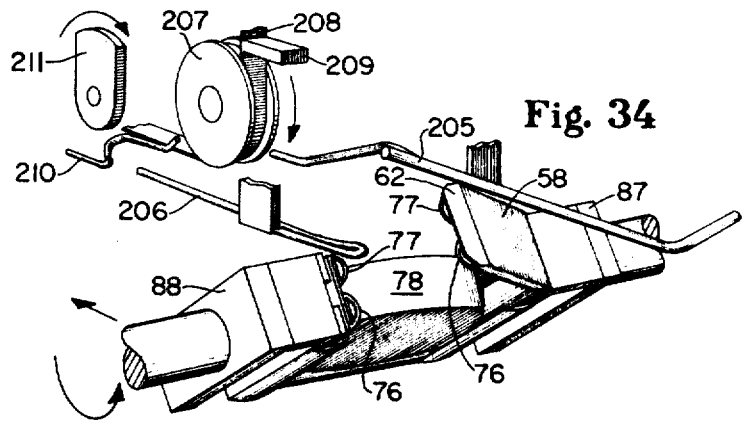
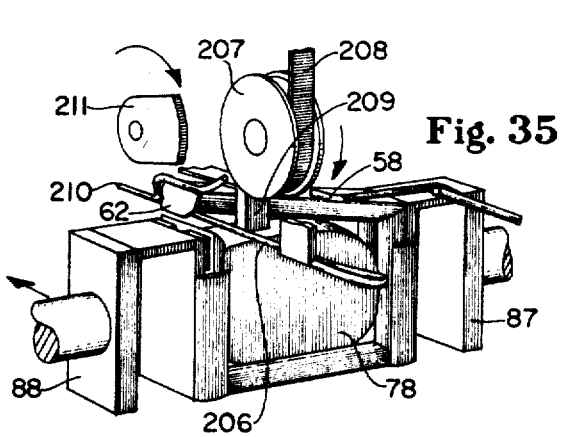
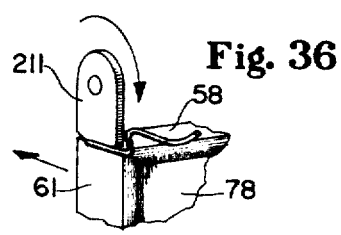
INVENTOR.
Howard N. Watrous
ATTORNEY Aug. 27, 1968     H. N. WATROUS     3,398,660
MACHINE FOR MAKING FRAME BLANKS AND FOR THEREAFTER
FORMING SAID BLANKS AROUND AN ARTICLE
Filed Sept. 20, 1966                                       8 Sheets-Sheet 7

INVENTOR.
Howard N. Watrous
BY *Fredrick H. Brown*
ATTORNEY

Aug. 27, 1968  H. N. WATROUS  3,398,660
MACHINE FOR MAKING FRAME BLANKS AND FOR THEREAFTER
FORMING SAID BLANKS AROUND AN ARTICLE
Filed Sept. 20, 1966  8 Sheets-Sheet 8

INVENTOR.
Howard N. Watrous
BY
Fredrick H. Braun
ATTORNEY

United States Patent Office 3,398,660
Patented Aug. 27, 1968

3,398,660
MACHINE FOR MAKING FRAME BLANKS AND FOR THEREAFTER FORMING SAID BLANKS AROUND AN ARTICLE
Howard N. Watrous, Cincinnati, Ohio, assignor to The Procter & Gamble Company, Cincinnati, Ohio, a corporation of Ohio
Filed Sept. 20, 1966, Ser. No. 580,774
26 Claims. (Cl. 93—49)

This invention relates to the art of packaging machines. More particularly, the invention relates to a machine for transforming a cut and scored flat blank of packaging material into a frame blank and thereafter forming and folding same around an article to provide a supporting frame for the article.

The inventive concept involves the provision of a machine which has as its primary object the capability of making frame blanks of the type generally disclosed in FIGURE 2 of U.S. Patent 3,159,274 issued on Dec. 1, 1964, to Robert V. Burt and commonly owned by the assignee of the present invention. In a generic sense, the machine has the ability to form the tubular support elements of the frame blank in any desired cross-sectional shape or configuration, e.g., triangular, rectangular, arcuate or the like. In the preferred form of the machine as herein described, the tubular support elements of the frame blank are formed into an arcuate configuration.

In addition to the above, the machine of the invention has the capability of folding and forming each successive frame blank into a supporting frame around an article of the type as also disclosed in the aforesaid Burt patent. When the article is assembled within and held by the supporting frame, the combination forms a unitary rigid package structure which can be overwrapped, if desired, by any equipment capable of doing so such as, for example, the machine illustrated and described in U.S. Patent 3,149,446 issued on December 21, 1964, to Charles R. Hood and commonly owned by the assignee of the present invention.

Brief summary of the invention

The machine of the present invention comprises a succession of operating sections which act sequentially on a flat packaging blank to transform it initially into a frame blank having tubular support elements along its edges. The frame blank is thereafter folded and formed around an article to enclose and support the article and thus provide a suitable supporting frame.

A stack of flat packaging blanks are initially placed in the machine. Each of the packaging blanks are cut and prescored into a plurality of adjoining wall panels having extending portions projecting laterally from the side edges thereof. The stack of flat packaging blanks are placed in a hopper from which they are successively fed in single file order to pass through the machine. Successive flat blanks are removed from the bottom of the hopper by a suitable blank feeding device which passes each individual blank to a pair of forwarding rolls from which the blanks are fed to an alignment section.

In the alignment section the successive flat packaging blanks are moved forward and slightly laterally while in contact with a stationary guide. On leaving the alignment section the side edges of the flat blanks are in proper later alignment for feeding to the tubular support forming section.

In the tubular support forming section the extending side portions of the flat blank are folded and manipulated at relatively high speed and without any stretching of the blank to form the tubular support elements of the frame. A plurality of appropriately shaped folding and bending rolls are provided for this purpose which act on the blank in sequence as it moves through the machine.

On completion of folding, bending and forming the tubular support elements for the frame blank, a narrow bead of adhesive is applied on the wall panels of the frame blank beneath the tubular support elements. The tubular support elements are then pressed down into place. The frame blanks next pass through a compression section which holds the frame blanks in their desired assembled configuration while the adhesive solidifies.

Successive frame blanks may then be delivered from the compression section to a surge section on the machine in which a plurality of completed frame blanks can be accumulated. The frame blanks are thereafter fed from the surge section to a cross direction folding section by means of an escapement linkage. Each frame blank is then formed into a rectangular supporting frame by suitable folding elements and placed around an article being packaged. The supporting frame is completed around the article by additional folding and tucking means as the frame and article are moved forward in unison. The assembled frame may be overwrapped if necessary or desirable although the detail of the mechanism for overwrapping does not form a part of the present invention.

Brief description of the several views of the drawings

FIGURE 1 is a fragmentary plan view of the machine, portions of which have been removed for clarity of illustration.

FIGURE 2 is a fragmentary elevation view of the machine of FIGURE 1 taken on the line 2—2 of FIGURE 1.

FIGURE 3 is a fragmentary end elevation view of the machine taken on the line 3—3 of FIGURE 1.

FIGURE 4 is a fragmentary plan view of the product conveyor taken on the line 4—4 of FIGURE 3.

FIGURE 10 is a fragmentary elevation view of the first set of bending rolls in cross section taken on the line 10–10 of FIGURE 9.

FIGURE 11 is a fragmentary elevation view of the second set of bending rolls in cross section taken on the line 11–11 of FIGURE 9.

FIGURE 12 is a fragmentary elevation view of the third set of bending rolls in cross section taken on the line 12–12 of FIGURE 9.

FIGURE 13 is a fragmentary plan view of additional folding, bending, and forming means acting successively on a packaging blank.

FIGURE 14 is a fragmentary elevation view of the folding element in cross section taken on line 14–14 of FIGURE 13.

FIGURE 15 is a fragmentary elevation view of the folding element in cross section taken on the line 15–15 of FIGURE 13.

FIGURE 16 is an additional fragmentary elevation view of the folding element in cross section taken on the line 16–16 of FIGURE 13.

FIGURE 17 is a fragmentary elevation view of a pair of folding rolls in cross section taken on the line 17–17 of FIGURE 13.

FIGURE 18 is a fragmentary elevation view of a pair of forming rolls in cross section taken on the line 18–18 of FIGURE 13.

FIGURE 19 is a fragmentary plan view taken at the end of the tubular support forming section showing folding and forming members, the adhesive applicator, and the beginning of the compression section.

FIGURE 20 is a fragmentary elevation view taken at the inlet of the folding member in cross section on the line 20–20 of FIGURE 19.

FIGURE 21 is a fragmentary elevation view through the folding member in cross section taken on the line 21–21 of FIGURE 19.

FIGURE 22 is a fragmentary elevation view through the folding member in cross section taken on the line 22–22 of FIGURE 19.

FIGURE 23 is a fragmentary elevation view at the inlet to the adhesive applicator in cross section taken on the line 23–23 of FIGURE 19.

FIGURE 24 is a fragmentary elevation view at the adhesive applicator in cross section on the line 24–24 of FIGURE 19.

FIGURE 25 is a fragmentary elevation view of the final folder in cross section on the line 25–25 of FIGURE 19.

FIGURE 26 is a fragmentary elevation view of the final folder in cross section on the line 26–26 of FIGURE 19.

FIGURE 27 is a fragmentary elevation view of the final folder in cross section taken on the line 27–27 of FIGURE 19.

FIGURE 28 is a fragmentary elevation view in cross section on the line 28–28 of FIGURE 19 and illustrating the inlet to the compression section.

FIGURE 29 is a fragmentary side elevation view showing the escapement linkage in cross section taken on the line 29–29 of FIGURE 1.

FIGURE 30 is a fragmentary plan view at the end of the surge section in cross section taken on the line 30–30 of FIGURE 29.

FIGURE 31 is a fragmentary plan view in cross section taken through the cross direction folder at the line 31–31 of FIGURE 3.

FIGURE 32 is a fragmentary plan view in cross section taken through the cross direction folder at the line 32–32 of FIGURE 3.

FIGURE 33 is a fragmentary perspective view taken at the end of the product conveyor showing the mechanism for completing the supporting frame around the article.

FIGURES 34, 35, and 36 are fragmentary perspective views similar to FIGURE 33 showing the sequence of operations formed on the frame blank to complete the supporting frame.

FIGURE 37 is a fragmentary plan view showing the drive mechanism for the various elements of the machine.

FIGURE 38 is a fragmentary elevation vew of the machine drive taken on the line 38–38 of FIGURE 37. This view is taken from the opposite side of the machine as shown in FIGURE 2.

FIGURE 39 is a fragmentary elevation view of the drive for the escapement linkage and the conveyor in the surge section.

FIGURE 40 is a fragmentary plan view of an alternate set of bending rolls which can be employed in the machine of this invention.

FIGURE 41 is a fragmentary elevation view of one set of bending rolls in cross section taken on the line 41–41 of FIGURE 40.

FIGURE 44 is a perspective view of a finished and assembled supporting frame made by the machine from the frame blank of FIGURE 43.

FIGURE 45 is a fragmentary elevation view in cross section taken through the package on the line 43—43 of FIGURE 42.

*Package made by machine*

As previously indicated, the present machine was invented for making a supporting frame for a package of the type generally disclosed in U.S. Patent 3,159,274 issued to Robert V. Burt. The machine is particularly suited to making a preferred form of the package of the type described in the Burt patent for a bar of soap or the like. In its finished form the preferred package frame is shown in FIGURES 44 and 45 of the drawings.

Figure 42:
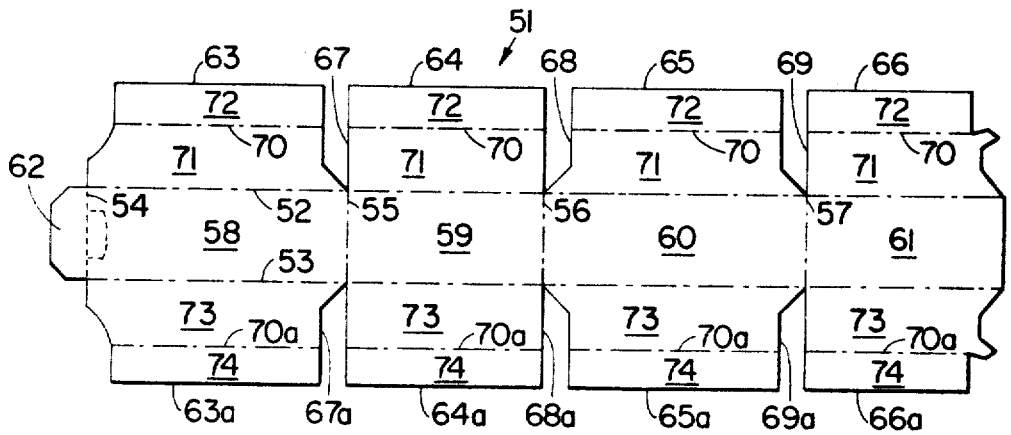
FIGURE 42 is a plan view of the flat packaging blank which is placed in the machine.

The package frame is made from a flat packaging blank 51 of the kind shown in FIGURE 42. The blank 51 is preferably made from a typical packaging material such as paperboard, cardboard, or the like. The blank 51 in FIGURE 42 is cut and prescored prior to being stacked in the machine hopper such that longitudinal score lines 52 and 53 are provided running the length of the blank and a series of vertical scores 54, 55, 56, and 57 are provided to divide the blank into a series of side-by-side wall panels 58, 59, 60, and 61 and an end tab 62. Extending portions 63, 64, 65, and 66 on the upper side and 63a, 64a, 65a and 66a on the lower side are separated by angular relief cut-outs 67, 68, and 69 on the upper side and 67a and 68a, and 69a on the lower side. The extending portions 63 . . . 66 are divided by a score line 70 into an inner area 71 and an outer area 72. The blank is symmetrical such that the extending portions 63a . . . 66a on the lower side as viewed in FIGURE 42 are similarly scored on the line 70a to form the inner areas 73 and the outer areas 74. The blank 51 is referred to throughout this specification as a packaging blank.

Figure 43:
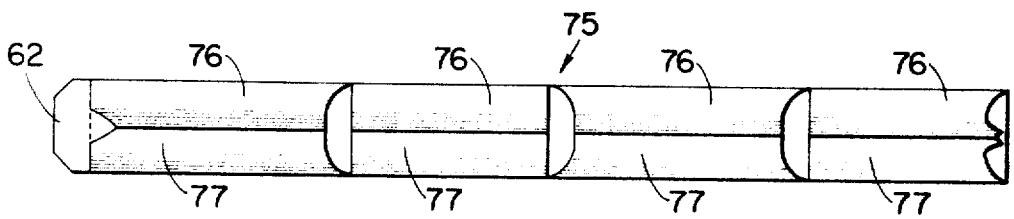
FIGURE 43 is a plan view of a frame blank which is made by the machine from the packaging blank of FIGURE 42.

The packaging blank 51 is initially folded and formed into a frame blank 75 as shown in FIGURE 43. In the frame blank 75 the extending portions 63, 64, 65, and 66 have been suitably bent, and folded to transform the flat inner area 71 into a tubular support 76. Similarly, the inner area 73 has been transformed into the tubular support 77. The outer areas 72 and 74 are adhered to the respective wall panels 58, 59, 60, and 61 as shown, for example, in cross section in FIGURE 45. It will also be apparent from FIGURE 45 that the preferred frame blank formed by the present machine has tubular support elements 76 and 77 of arcuate configuration although other shapes can be formed, if desired. The frame blank as fabricated to the point illustrated in FIGURE 43 will be referred to throughout this description as a frame blank 75 to distinguish it from the packaging blank 51.

The completed frame blank 75 is folded along its vertical scores 54, 55, 56, and 57 to form it around an article so that the tubular supports 76 and 77 engage its surfaces. In FIGURE 44, for example, a bar of soap 78 is snugly held on four sides by the tubular supports 76 and 77. FIGURE 44 illustrates the complete supporting frame 79 in which the end tab 62 has been tucked in place inside the wall panel 61. The complete frame as seen in FIGURE 44 will be referred to throughout the description as a supporting frame 79 in order to distinguish it from the frame blank 75 and the packaging blank 51.

The supporting frame 79 may, if desired, be overwrapped with an opaque or transparent wrapper by the use of conventional apparatus, the scope of which is beyond the contemplation of the present invention. Overwrapping can be carried out in an apparatus of the type described in the aforesaid Hood Patent 3,149,446. However, the supporting frame 79 can also be considered a finished package even though it might be further processed in a preferred form.

General machine arrangement

Before describing the detailed construction of the machine, it is believed that a general discussion of its construction would be desirable at this point so that the more detailed structure will be more easily understood. The machine can be divided into a number of operating sections which act successively on flat packaging blanks 51 continuously and at relatively high speeds in order to ultimately arrive at a supporting frame enclosing a bar of soap 78 or any equivalent article. Speeds in excess of 300 completed supporting frames per minute can be achieved with the present machine structure.

Referring now to FIGURES 1 through 4, the hopper section 80 is located at the inlet to the machine. A vertical stack of flat packaging blanks 51 are placed in the hopper section. Successive flat packaging blanks 51 are withdrawn from the bottom of the stack from where they are fed to the alignment section 81 in which the blanks 51 are laterally aligned with respect to their side edges prior to the folding, bending, forming, and gluing operations.

A tubular support forming section 82 is provided for folding, bending, and forming the flat packaging blanks 51 to produce the tubular supports 76 and 77. Adhesive applicator means are provided for adhering the outer areas 72 and 74 to the inner surfaces of the wall panels 58, 59, 60, and 61. The compression section 83 is provided to hold the frame blank 75 in proper configuration as it moves forward until the adhesive has set.

A surge section 84 is provided in which a plurality of frame blanks 75 can be collected and fed laterally until ready for the next forming operation. The length of the surge section is such that it can be used as a storage reservoir, if necessary, to collect all frame blanks in process from the hopper section 80 and beyond such that partially fabricated frame blanks will not be left in the machine in the event of an unexpected shutdown. The surge section 84 also acts as a supply source for frame blanks 75 when starting up the machine until additional frame blanks 75 are received from the compression section 83.

A cross direction folding section 85 is provided to which the frame blanks 75 are fed from the surge section 84. In the cross direction folding section 85 the frame blanks 75 are folded on their vertical scores 54, 55, 56, and 57 to transform them into substantially rectangular form prior to delivery over and around a bar of soap 78.

The partially erected frame blanks 75 are placed over and around successive bars of soap 78 on the product conveyor 86 as seen in FIGURE 4. Thereupon they are moved forward and then clamped between the mandrels 87 and 88 to be moved through the last sequencse of folding and tucking wherein the tab 62 is pushed into place to complete the supporting frame 79 around the bar of soap 78.

Hopper section

Figure 5:
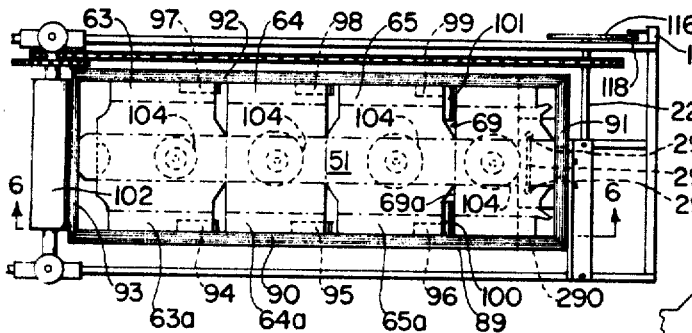
FIGURE 5 is a fragmentary detailed plan view of the hopper of the machine illustrated with a stack of packaging blanks in place.
Figure 7:
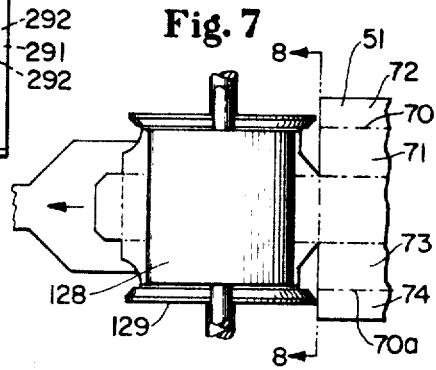
FIGURE 7 is a fragmentary plan view illustrating the first pair of folding rolls acting on a packaging blank.
Figure 6:
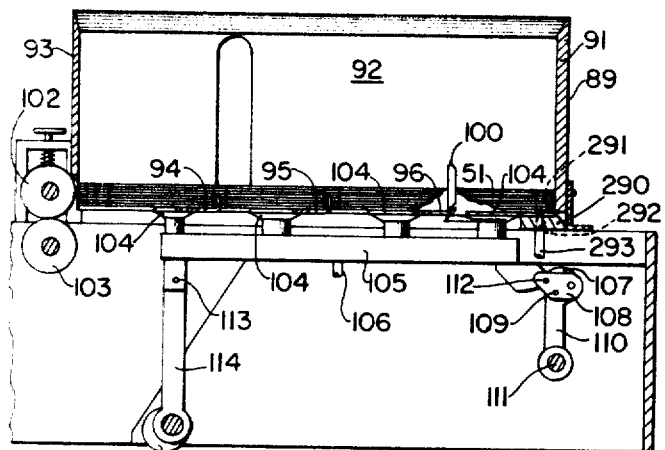
FIGURE 6 is a fragmentary elevation view of the hopper in cross section taken on the line 6—6 of FIGURE 5.
Figure 8:
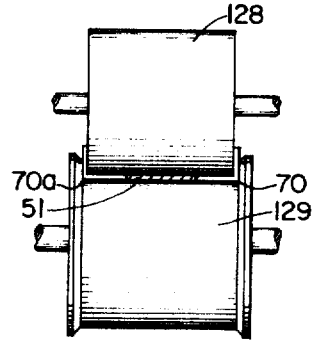
FIGURE 8 is a fragmentary elevation view of the folding rolls in cross section taken on the line 8–8 of FIGURE 7.

The hopper section 80 generally illustrated in FIGURES 1 and 2 is shown in greater detail in FIGURES 5 and 6. The hopper 89 is composed of a plurality of side walls 90, 91, 92, and 93 positioned to receive a stack of flat packaging blangs 51. The packaging blanks 51 are supported on one side by the blank supports 94, 95, and 96 which project inwardly from the wall 90. A similar set of supports 97, 98, and 99 are provided projecting inwardly from the side wall 92. Alignment guides 100 and 101 project upwardly in the angular relief areas 69 and 69a of the blanks to maintain them in proper alignment in the hopper. It will be seen that by supporting the trailing edge of the extending portions 63, 63a, 64, 64a, 65, and 65a of the flat packaging blanks, the blank supports 94 . . . 98 prevent gating and permit removal of successive individual blanks 51 from the stack for feeding to the driven forwarding rolls 102 and 103.

Successive packaging blanks 51 are removed from the bottom of the stack by the vacuum cup device and its associated linkage now to be described. As seen in FIGURE 6, a plurality of vacuum cups 104 are secured to a vacuum manifold 105 which is hollowed and communicates with a vacuum source (not shown) by means of the flexible conduit 106.

The mechanism for moving the vacuum cups includes a crank 107 which is rotated continuously by the shaft 221 (see FIGURES 5, 37, 38) and drives a connecting member 108 which is pivoted at 109 to the crank 110 which is journaled on the member 111. The vacuum manifold 105 is pivoted at 112 to the connecting member 108. The forward end of the vacuum manfold 105 is pivoted at 113 to a connecting rod 114 the lower end of which is moved in a circular path by the crank 115 turned continuously by the shaft 223 (FIGURES 37 and 38).

Thus, on rotation of the cranks 107 and 115, the vacuum cups 104 are engaged against the bottomost member of the stack of blanks 51. Vacuum is applied and the manifold 105 is moved forwardly and slightly downwardly. The cups 104 pick up and carry the bottom blank 51 to remove it from the stack. This bottom blank is delivered to the nip of the forwarding rolls 102 and 103 (FIGURES 1, 2, 5, and 6) which are positively driven to continue the forward movement of the blank. When the leading edge of the blank is engaged by the forwarding rolls 102 and 103, vacuum is removed from the vacuum cups 104 so that they disengage the blank whereupon they are returned for the next cycle by the mechanism previously described. The mechanism for moving the vacuum cups 104 is a modified four-bar linkage.

The machine may be operated at times when blank feeding is not desired for brief intervals. During these periods, vacuum is not applied to the vacuum manifold 105 and yet the vacuum cups 104 will engage and tend to dislodge the bottom blank 51 in the hopper 89. To prevent this phenomenon during such periods, the cross support member 290 is provided with a slot 291 and apertures 292 leading to a conduit 293 which is also connected to a vacuum source (not shown). The control for the blank feed system (to be hereinafter explained) is operated so that vacuum is applied to the slot 291 during such periods when no blank feeding occurs. The vacuum in the slot 291 prevents the bottom blank 51 from being carried forwardly by frictional engagement with the vacuum cups 104.

The control mechanism for applying and exhausting vacuum includes a four-way valve (not shown) the inlet of which communicates with a vacuum pump (not shown). The four-way valve is controlled by a portion of the electrical control circuit of the machine. The four-way valve controls the vacuum to the slot 291 by means of the conduit 293. The four-way valve also controls the vacuum to the cups 104 through an intermediate three-way valve (not shown). A switch 117 is provided with a follower 118 which rides on the surface of the cam 116 rotating continuously on the shaft 221. The switch 117 actuates the three-way valve to periodically apply and release vacuum to the conduit 106 unless overridden by the four-way valve. The operative details of this arrangement are believed to be conventional and will be familiar to persons skilled in the art.

Alignment section

The alignment section 81 is best seen in FIGURES 1 and 2. It consists of an endless belt 119 driven continuously and mounted over the support pulleys 120 and 121. A pair of alignment rollers 122 supported on the arms 123 bear down against the belt 119 and keep successive packaging blanks 51 in firm engagement with the belt. Springs 124 are provided to bias the rollers 122 against the belt.

The rollers 122 are slightly angled to that they move the packaging blanks 51 slightly laterally against the edge 125a of the guide 125 running the length of the alignment section 81. As a result, each packaging blank becomes properly aligned as it is fed into the second set of driven forwarding rollers 126 and 127. It will be noted in FIGURE 1 that the edge 125a of the guide 125 is at a slight angle with respect to the line of movement of the belt 119 in order to gradually bring each of the packaging blanks into alignment as it is carried forward.

*Tubular support forming section*

After passing through the alignment section, the packaging blank 51 is in proper lateral position for folding, bending, and forming the tubular support elements 76 and 77. As a first step the packaging blank 51 is passed between a first pair of folding rolls consisting of an upper roll 128 and a flanged lower roll 129 (see FIGURES 1, 2, 7, and 8). In passing between the rolls 128 and 129, the blank 51 is folded on the score lines 70 and 70a which separate the outer areas 72 and 74 from the inner areas 71 and 73, respectively.

From the first set of folding rolls the blanks 51 are then passed through a series of bending rolls for contouring the arcuate portion of the tubular support elements 76 and 77. This is done by bending the packaging blank 51 in the inner areas 71 and 73 at spaced intervals between the score lines which define the inner areas 71 and 73. Bending is accomplished without stretching of the board material by means of the rolls shown generally in FIGURES 1 and 2 and in greater detail in FIGURE 9.

The bending rolls are arranged in sets such that succesive upper rolls 130, 131, and 132 are of diminishing width. As seen in FIGURE 10, the first upper roll 130 cooperates with a pair of tapered rolls 133 and 134 which combine to form the first set of bending rolls in forming the package blank. The tapered rolls 133 and 134 are urged upwardly against the roll 130 by means of the springs 135 which bear against the frame 136 at one end and against the collars 137 at the other end. Thus, as the rolls 130, 131, and 132 are driven (by means to be described hereinafter) the tapered rolls 133 and 134 tend to be frictionally driven due to the pressure of the springs 135 urging the rolls 133 and 134 upwardly against the blank interposed against the roll 130.

A similar arrangement is provided for the second set of bending rolls comprising the upper roll 131 and the tapered rolls 138 and 139 (see FIGURE 11). The tapered rolls 138 and 139 are mounted in similar fashion to the rolls 133 and 134. The last set of bending rolls is shown in FIGURE 12. This set consists of the upper roll 132 which coacts with the angular rolls 140 and 141 the latter again being supported and spring urged as in the case of the tapered rolls 133 and 134. On passing through the last set of bending rolls, the packaging material of the blank 51 is sufficiently flexed and bent in the inner areas 71 and 73 to be readily formed into a tubular support 76 and 77 of substantially arcuate cross section.

The blank is thereafter carried through the additional folding and forming elements illustrated in FIGURES 1, 2, and 13. The blank initially is passed through a folding element 142 and under a guide element 143 which combine to fold over the outer areas 72 and 74 flat against the blank in order to form a reasonably sharp crease. Cross sections through the folding element 142 are seen in FIGURES 14, 15, and 16 where it can be seen how the movement of the blank results in the folding action heretofore described. It will be noted that the guide element 143 maintains the blank against the table or plate 144 such that the downward curvature of the folding element 142 will cause the blank to leave in the configuration shown in FIGURE 16.

The blank is then carried to the second set of folding rolls as shown in FIGURES 1, 2, 13, and 17. These folding rolls consist of an upper roll 145 and a flanged lower roll 146 suitably driven at substantially constant speed by means to be described hereinafter. The rolls 145 and 146 form a reasonably sharp crease in the blank 51 along the horizontal scores 52 and 53.

Blanks 51 are then fed to the forming rolls shown in FIGURE 18 which consist of an upper roll 147 having V-notches 148 and 149 on opposite sides and a sheave 150 having an endless belt 151 running thereover. The notches 148 and 149 open and shape the tubular elements 76 and 77 from the flat position assumed when passing between the folding rolls 145 and 146. As a consequence, the tubular support elements 76 and 77 are formed prior to passage of the blank 51 into the last phase of the folding, bending, and forming device shown in FIGURES 1, 2, and 19.

The blanks 51 are now carried forward by the belt 151 into a folding member 152 which is hollowed and properly shaped to cause further bending on the horizontal scores 52 and 53 which will be observed from an examination of the successive cross sections taken through the folding member 152 as exemplified by FIGURES 20, 21, and 22.

On leaving the folding member 152, the blank passes beneath the idler roller 153 and then to the adhesive applicator device. The belt 151 passes downwardly over the pulley 154 and around the pulley 155 as illustrated in FIGURE 23. This provides clearance beneath the adhesive applicator. The belt passes upwardly and around the pulley 156 to return to ts path of travel as best seen in FIGURES 2 and 24.

The blank 51 then passes under the adhesive nozzle 157 which is preferably supplied with any well known hot melt adhesive which can be applied through the apertures 158 and 159. As a result, two thin continuous stripes of adhesive 160 and 161 are applied to the wall panels 58, 59, 60, and 61 of the blank 51 beneath the outer areas 72 and 74. The blank then passes through a final folder element 162 whereupon the tubular supports 76 and 77 are progressively moved downwardly as shown in sequence by FIGURES 25, 26, and 27 such that the outer areas 72 and 74 are pushed against the adhesive stripes 160 and 161 to complete the formation of the frame blank 75.

*Compression section*

On leaving the final folder 162, the frame blank 75 moves into the compression section 83, the inlet of which is shown in FIGURE 28. In the compression section, the belt 151 carries the frame blank 75 beneath the elongated endless belt 163 which has a series of spaced rollers 164 (see also FIGURE 2) which hold it in engagement at the convergence of the tubular support element 76 and 77. As a consequence the adhesive stripes 160 and 161 tend to set as the frame blank 75 moves through the compression section 83. On being discharged from the compression section 83 the adhesive has set sufficiently so that the frame blank 75 is complete when it is discharged into the surge section 84.

*Surge section*

The frame blanks 75 are delivered to the surge section as shown in FIGURES 1, 2, and 3 beneath the rotating bristled element 165. The speed of the machine is such that the completed frame blanks 75 are delivered at such a velocity as to cause a tendency to "bounce" off the guide wall 166 on delivery to the surge section. However, the rotation of the bristled element 165 while in contact with the upper surface of a frame blank prevents such bounce and permits the frame blanks 75 to be carried laterally by means of the pusher elements 172 on the lateral chain conveyors 173 and 174. The frame blanks 75 are then delivered to the conveyor belts 167 and 168 for movement to the end of the surge section. The guides 169 and 170 (FIGURES 2, 29, and 30) maintain the frame blanks 75 in engagement with the belts 167 and 168 as they move forward and until they are restrained from further movement by the spring elements 171 (FIGURE 29) which hold back the frame blanks and allow slippage of the belts 167 and 168 on their lower surface.

The length of the surge section is such that a substantial number of frame blanks 75 can be accumulated in the event the next segment of the machine has no demand for frame elements. This permits all partially formed frame elements in the hopper section 80 and beyond to be completed and fed into the surge section when no additional frame blanks are being fed. In other words, the hopper section 80, the alignment section 81, the tubular support forming section 82, and the compression section 83 can be cleared of partially formed frame blanks and when completed, these can be stored in the surge section until picked out and fed by the escapement linkage to be hereinafter described. Accumulated frame blanks 75 in the surge section 84 also act as a supply source when starting up the machine until additional new frame blanks 75 are received from the compression section 83.

*Escapement linkage*

An escapement linkage is provided to remove and feed successive frame blanks 75 from the surge section 85 by overcoming the tension in the spring elements 171. The escapement linkage is best seen in FIGURES 3 and 29.

A drive shaft 175 is suitably journaled in the support plate 176. A driving crank 177 is keyed to the shaft 175. A picker finger 178 is pivoted to the driving crank 177 at the pin 179.

A connecting member 180 is pivoted at 181 to the picker finger 178. The upper end of the connecting member 180 is journaled on the pin 182 which is secured to the arm 183. The arm 183 is keyed to the shaft 184 which is journaled in the support plate 176.

The connecting link 185 is also keyed to the shaft 184. The upper end of the connecting link 185 is attached to the armature 186 of the solenoid 187. A spring 188 is provided such that one end is attached to the lower end of the connecting link 185 and the other end is attached to the machine frame.

In the position shown in FIGURE 29, the solenoid 187 is deenergized such that the spring 188 pulls the solenoid armature 186 to its deenergized position thereby causing the arm 183 to rotate clockwise and thereby lowering the pivot 181 so that the sharp end 189 of the picker finger 178 engages and picks off a frame blank 75 on each revolution of the driving crank 177. The path of movement of the sharp end 189 is denoted by the dot-dash line 212.

When the solenoid 187 is energized, the arm 183 is rotated counterclockwise by the shaft 184. This raises the pivot 181 such that the sharp end 189 will clear the frame blanks 75 being held by the spring elements 171. In the latter position, the path of movement 212 will be similar but raised sufficiently so that the end 189 will clear the frame blanks 75.

The illusrtated mechanism is duplicated on the far side of the solenoid 187 so that a pair of spaced picker fingers 178 (only one shown) provide initial movement of the frame blank 75 to the conveyor chains 190 running over the sprockets 191 (see also FIGURE 30). The conveyor is provided with a plurality of pusher elements 192 which move the frame blank after it has been removed from beneath the spring elemenst 171. As illustrated in FIGURE 30, the frame blank 75 is shown as it is about to be picked up by the conveyor 190. A second frame blank 75 is being pushed downwardly by the pusher elements 192 carried by the conveyor 190. As the frame blanks are moved by the conveyor 190, the end tab 62 of each frame blank 75 passes over a folding cam 193 which causes the end tab 62 to be folded over on the score line 54. The end tab 62 is then in position for further folding and tucking as will be apparent as the description proceeds.

*Cross direction folder section*

As aforesaid, the frame blanks 75 are moved into the cross direction folder section 85 by the conveyor 190. In doing so the frame blank as seen in FIGURE 31 engages the folding channels 194 (see also FIGURE 3) and 195 which causes the frame blanks to be folded on the vertical scores 55 and 56. The frame blank is held by friction in the cross direction folder section by the guide bars 196, 197, and 198 which tend to hold the frame blank in the channels 194 and 195.

The frame blanks are moved downwardly by the conveyor 190 and partially through the cross direction folder section 85 as seen in FIGURE 3. Beyond the conveyor 190, choke feeding of frame blanks 75 causes them to continue their downward movement whereupon the panel 61 engages the folding bar 199 to form the fold at the vertical score 57 as shown in FIGURE 32. Simultaneously, the folding channel 194 is curved outwardly to open the frame blank as it moves into position over a bar 78 such that it can be placed around the bar.

The frame blank in the configuration shown in FIGURE 32 is thereupon deposited around the bar 78 which is moved forward on the product conveyor 86 (see also FIGURE 4). The product conveyor 86 is provided with pushers 200 which assure proper spacing of the bars 78 with respect to frame blanks and the machine elements when brought into assembled position.

*Final folding and end tab tucking section*

The partially assembled bar 78 and frame 75 are carried forward by the pusher 200 on the conveyor 86 and maintained in partially assembled relation by the guides 201 and 202 (FIGURES 4 and 33). On arrival at the final folding and tucking station the mandrels 87 and 88 move in and grasp the frame blank pushing inwardly against the bar 78. The mandrels 87 and 88 may form a part of an overwrap machine as described in the Hood patent, supra. The pusher 200 is lowered by internal means (not shown) whereupon the assemblage is removed from the conveyor 86 for the final tucking and folding operation.

A stationary folder bar 205 is mounted such that when the bar and frame assembly are rotated and translated by the mandrels 87 and 88 (FIGURE 34), the folder bar 205 moves the panel 58 into position for finishing the assembly. A stationary holder bar 206 is provided to engage the tubular supports 76 and 77 on the underside of the wall panel 58 to prevent it from being folded down too far by the folder bar 205. The pulley 207 supports a belt 208 having pusher guides 209 projecting therefrom. As the bar and frame asembly move into the final tucking phase, the moving guide 209 supports the panel 58 to maintain it in alignment as the various folding elements are otherwise working on the frame.

A tucking bar 210 is provided to guide the end tab 62 into the space between the wall panel 61 and its tubular supports 76 and 77. The rotating tucking cam 211 pushes the end tab 62 into place to complete the assembly of the supporting frame 79 around the bar 78.

*Machine drive*

All of the heretofore described elements and mechanisms of the machine are driven in synchronous relationship by a fully integrated drive that can operate continuously or intermittently as will be seen from a consideration of FIGURES 37, 38, and 39.

The main drive shaft 215 is driven by the chain 216 from a suitable source (not shown). The endless chain 217 is driven from the main drive shaft 215 by means of the gear train 218 and 219. The chain 219 rotates the crank 107 (FIGURE 6) by means of the sprocket 220 connected to the shaft 221. The cam 116 is also driven by the shaft 221 (FIGURES 5, 37, and 38). Similarly, the drive for the crank 115 (FIGURE 6) is from the sprocket 222 attached to shaft 223. The forwarding rolls 102 and 103 are driven by a gear train 224, 225, and 226 from a shaft 27 driven by the gear 219.

A drive chain 228 driven from the main drive shaft 215 drives the belt 119 by means of the sprocket 229. The chain 228 also drives a shaft 230 by means of the sprocket 231. The forwarding rolls 126 and 127 (FIGURE 2) are driven by the gear train 232, 233, and 234 from the shaft 230. Similarly, the shaft 230 drives the rolls 130, 131, and 132 by means of the chain 235 which drives the gear train 236, 237, 238, 239, and 240. A chain 241 is also driven from the shaft 230 and drives the shaft 242 which in turn drives the folding roll 146 and the shaft 245 by means of the gears 243 and 244. The sheave 150 which supports one end of the belt 151 is journaled on the shaft 245.

The shaft 246 is driven through the right angle gears 247 and 248. The shaft 249 is driven from the right angle gears 250 and 251 to drive the belt 151. The hold down belt 163 is driven from the shaft 249 by the gear train 252 and 253. The rotating bristled element 165 is driven from the shaft 249 by the gear train 254 and 255 acting through the belt 256 (see also FIGURE 1). The shaft 257 is driven by the shaft 246 through the gear train 258, 259, 260, and 261.

The lateral chain conveyors 173 and 174 are driven by the shaft 257 as are the belts 167 and 168. The other end of the belts 167 and 168 are supported by sheaves 262 and 263 which rotate freely on the drive shaft 264 for the conveyor 190.

A separate drive is provided for the escapement linkage and the conveyor 190 as best seen in FIGURES 37 and 39. The separate drive is normally operated synchronously with the other components of the machine. When desired, however, the separate drive can be independently operated to remove completed frame blanks 75 from the surge section 84 without operating the other components. The separate drive consists of a drive chain 265 suitably driven by a source (not shown) to drive the shaft 266. The chain 267 is driven from the shaft 266 so that it rotates the drive shaft 264 for the conveyor 190. In addition, the chain 267 rotates the sprocket 268 which drives the chain 269 for operation of the escapement linkage through the drive sprocket 270 which drives the shaft 175.

*Alternate bending mechanism*

An alternate mechanism for bending the packaging blank 51 in the inner areas 71 and 73 is shown in FIGURES 40 and 41. The mechanism consists of a base 272 and a set of bending rolls. The bending rolls include upper rolls 273 and 274 which differ in width as shown in FIGURE 40. As shown in FIGURE 41, the first set of bending rolls also includes grooved bending rolls 275 and 276 which are contoured to match the side and peripheral contour of the bending roll 273.

The grooved bending rolls are supported by the carriages 277 and 278. The carriages 277 and 278 may be moved upwardly into engagement with the packaging blank 51 moving beneath the bending roll 273 by means of the pneumatic cylinders 279 and 280. These cylinders may also be retracted if and when necessary to provide access to the bending rolls and/or to remove improperly formed blanks, etc.

Similarly, the second set of bending rolls includes the upper roll 274 and the grooved rolls 281 and 282 supported on carriages 283 and 284 the latter being actuated in similar fashion as the carriages 277 and 278.

Figure 9:
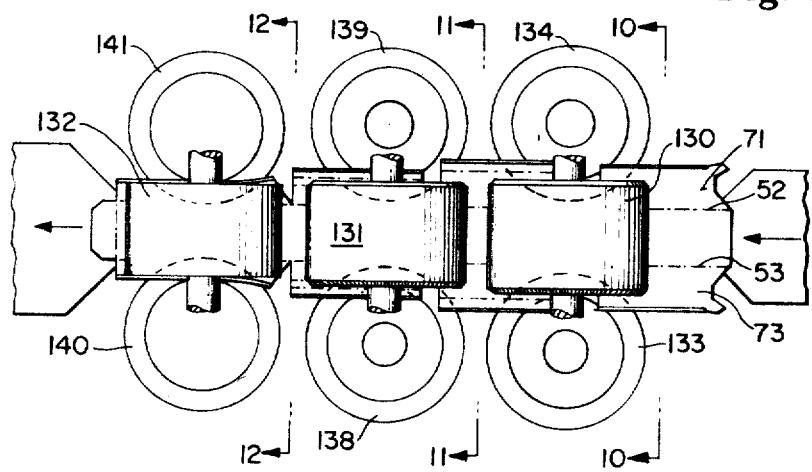
FIGURE 9 is a fragmentary plan view showing several sets of bending rolls acting successively on a packaging blank.

In operation the bending roll set of FIGURES 40 and 41 can be used in place of the bending roll set shown in FIGURE 9 in the same relative position of the machine.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. A machine for forming a frame blank for an article to be packaged, said apparatus comprising a hopper for receiving a plurality of flat packaging blanks in a stack, said blanks including a plurality of adjoining wall panels and extending portions projecting laterally from the sides of said wall panels, means for moving a blank in said stack to a tubular support forming section, means at said section for folding, bending and forming the extending portions of said blank into a pair of tubular support elements extending longitudinaly along the side edges of the wall panels of said blank, and means for adhering the tubular support elements to the inner surface of the wall panels of said blank to complete the transformation of the flat packaging blank into a frame blank for an article to be packaged.

2. A machine for forming a frame blank as claimed in claim 1 wherein said folding, bending and forming means at said tubular support forming section includes a plurality of sets of rolls for creasing and folding the extending portions of said packaging blanks along the preselected longitudinal score lines including the score lines separating the wall panels of the blank from the extending portions thereof.

3. A machine for forming a frame blank as claimed in claim 2 including a plurality of sets of bending rolls for forming and contouring the extending portions of said packaging blanks intermediate the score lines defining the inner area of the frame blank.

4. A machine for forming a frame blank as claimed in claim 3 wherein said creasing and folding rolls comprise a first set of folding rolls for folding the score lines separating the outer and inner areas of said packaging blank, a second set of folding rolls for folding the score lines separating the wall panels from the extending portions of said blank, said bending rolls being located intermediate said first and second set of folding rolls.

5. A machine for forming a frame blank as claimed in claim 4 including an extruder for applying a stripe of adhesive to the wall panels beneath the formed tubular support elements, and means for thereafter folding down the tubular support elements against said adhesive stripes to complete the blank formation.

6. A machine for forming a frame blank as claimed in claim 5 including a compression section beyond said extruder for holding down said tubular support elements as the completed frame blanks move forward in the machine until the adhesive was solidified.

7. A machine for forming a frame blank as claimed in claim 1 wherein said hopper comprises a plurality of side walls for receiving a vertical stack of flat packaging blanks, a plurality of curved blank supports projecting from the side walls of said magazine between the angular relief cut-outs of said frame blanks, the lower portion of said blank supports projecting forward such that successive blanks can be withdrawn and fed forward to said blank moving means.

8. A machine for forming a frame blank as claimed in claim 7 wherein said blank moving means comprises a plurality of vacuum cups and means for moving said vacuum cups into contact with the lowermost blank in said hopper and thereafter moving said blank forward whereby it is withdrawn from the bottom of said vertical stack.

9. A machine for forming a frame blank as claimed in claim 8 wherein the means for moving the vacuum cups comprises a modified four-bar linkage.

10. A machine for forming a frame blank as claimed in claim 8 including a pair of constantly driven forwarding rolls, said vacuum cups delivering successive blanks from the bottom of said stack in said magazine to said forwarding rolls for further movement through said apparatus.

11. A machine for forming a frame blank as claimed in claim 10 wherein said blanks are delivered from said forwarding rolls to an alignment section, means in said alignment section for bringing the side edges of successive flat packaging blanks into edgewise alignment prior to feeding said blanks into said tubular support forming section.

12. A machine for forming a frame blank as claimed in claim 11 including a stationary guide at said alignment section, said guide being contacted by the side edges of successive flat packaging blanks as they are moved through said alignment section such that the blanks are brought into edgewise alignment.

13. A machine for forming a supporting frame for an article to be packaged, said apparatus comprising a hopper for receiving a plurality of flat packaging blanks in a stack, said blanks including a plurality of adjoining wall panels and extending portions projecting laterally from the sides of said wall panels, means for moving a blank in said stack to a tubular support forming section, means at said section for folding, bending, and forming the extending portions of said blank into a pair of tubular support elements extending longitudinally along the side edges of the wall panels of said blank, means for adhering the tubular support elements to the inner surface of the wall panels of said blank to complete the transformation of the flat packaging blank into a frame blank for an article to be packaged, a surge section, means for successively forwarding each successive frame blank into said surge section, means for successively removing frame blanks from said surge section and feeding them into a cross direction folder section, means in said cross direction folder for forming the frame blank into a rectangular shape for placement around an article, and means for joining the free ends of the frame blank to complete a supporting frame for said article.

14. A machine for forming a supporting frame as claimed in claim 13 wherein said surge section includes means for moving successive frame blanks laterally, said surge section being of sufficient length to hold and accumulate a plurality of completed frame blanks at least equal in number to the number of blanks being formed beginning from said hopper.

15. A machine for forming a supporting frame as claimed in claim 14 including an escapement linkage at the end of said surge section, said escapement linkage including a picker finger for picking successive frame blanks and feeding them into the cross direction folder section.

16. A machine for forming a supporting frame as claimed in claim 15 including means for preventing frame blanks being fed into said surge section from bouncing off the guide wall thereof.

17. A machine for forming a supporting frame as claimed in claim 16 wherein said bounce preventing means comprises a bristled wheel in contact with the frame blanks delivered to said surge section, said wheel being driven such that its periphery moves in the direction of movement of the frame blanks delivered to said surge section.

18. A machine for forming a supporting frame as claimed in claim 16 including means for carrying forward said article and means for delivering the partially erected frame in place over an article moving on said conveyor.

19. A machine for forming a supporting frame as claimed in claim 18 wherein said means for joining the free ends of the frame blank includes a means for tucking the end tab of said frame blank inside the opposite end of said frame blank to complete the supporting frame.

20. A machine for forming a supporting frame as claimed in claim 13 wherein said folding, bending, and forming means at said tubular support forming section includes a plurality of sets of rolls for creasing and folding the extending portions of said packaging blanks along the preselected longitudinal score lines including the score lines separating the wall panels of the blank from the extending portions thereof.

21. A machine for forming a supporting frame as claimed in claim 20 including a plurality of sets of bending rolls for forming and contouring the extending portions of said packaging blanks intermediate the score lines defining the inner area of the frame blank.

22. A machine for forming a supporting frame as claimed in claim 21 wherein said creasing and folding rolls comprise a first set of folding rolls for folding the score lines separating the outer and inner areas of said packaging blank, a second set of folding rolls for folding the score lines separating the wall panels from the extending portions of said blank, said bending rolls being located intermediate said first and second set of folding rolls.

23. A machine for forming a supporting frame as claimed in claim 22 including an extruder for applying a stripe of adhesive to the wall panels beneath the formed tubular support elements, and means for thereafter folding down the tubular support elements against said adhesive stripe to complete the frame blank formation.

24. A machine for forming a supporting frame as claimed in claim 13 wherein said hopper comprises a plurality of side walls for receiving a vertical stack of flat packaging blanks, a plurality of curved blank supports projecting from the side walls of said magazine between the angular relief cut-outs of said frame blanks, the lower portion of said blank supports projecting forward such that successive blanks can be withdrawn and fed forward to said blank moving means.

25. An apparatus for forming a supporting frame as claimed in claim 24 wherein said blank moving means comprises a plurality of vacuum cups and means for moving said vacuum cups into contact with the lowermost blank in said hopper and thereafter moving said blank forward whereby it is withdrawn from the bottom of said vertical stack.

26. An apparatus for forming a supporting frame as claimed in claim 25 including a pair of constantly driven forwarding rolls, said vacuum cups delivering successive blanks from the bottom of said stack in said hopper to said forwarding rolls for further movement through said apparatus.

References Cited

UNITED STATES PATENTS 2,669,167   2/1954   Behl _____ 93—49
2,900,882   8/1959   Theobald _____ 93—84

BERNARD STICKNEY, *Primary Examiner.*

UNITED STATES PATENT OFFICE
CERTIFICATE OF CORRECTION

Patent No. 3,398,660                                          August 27, 1968

Howard N. Watrous

It is certified that error appears in the above identified patent and that said Letters Patent are hereby corrected as shown below:

Column 1, line 66, "later" should read -- lateral --. Column 3, line 59, "vew" should read -- view --. Column 5, line 55, "sequencse" should read -- sequence --; line 65, "blangs" should read -- blanks --. Column 9, line 58, "illusrtated" should read -- illustrated --; line 65, "elemenst" should read -- elements --. Column 12, line 43, after "the" insert -- frame --.

Signed and sealed this 3rd day of February 1970.

(SEAL)
Attest:

Edward M. Fletcher, Jr.                          WILLIAM E. SCHUYLER, JR.
Attesting Officer                                              Commissioner of Patents